United States Patent Office 3,217,542
Patented Nov. 16, 1965

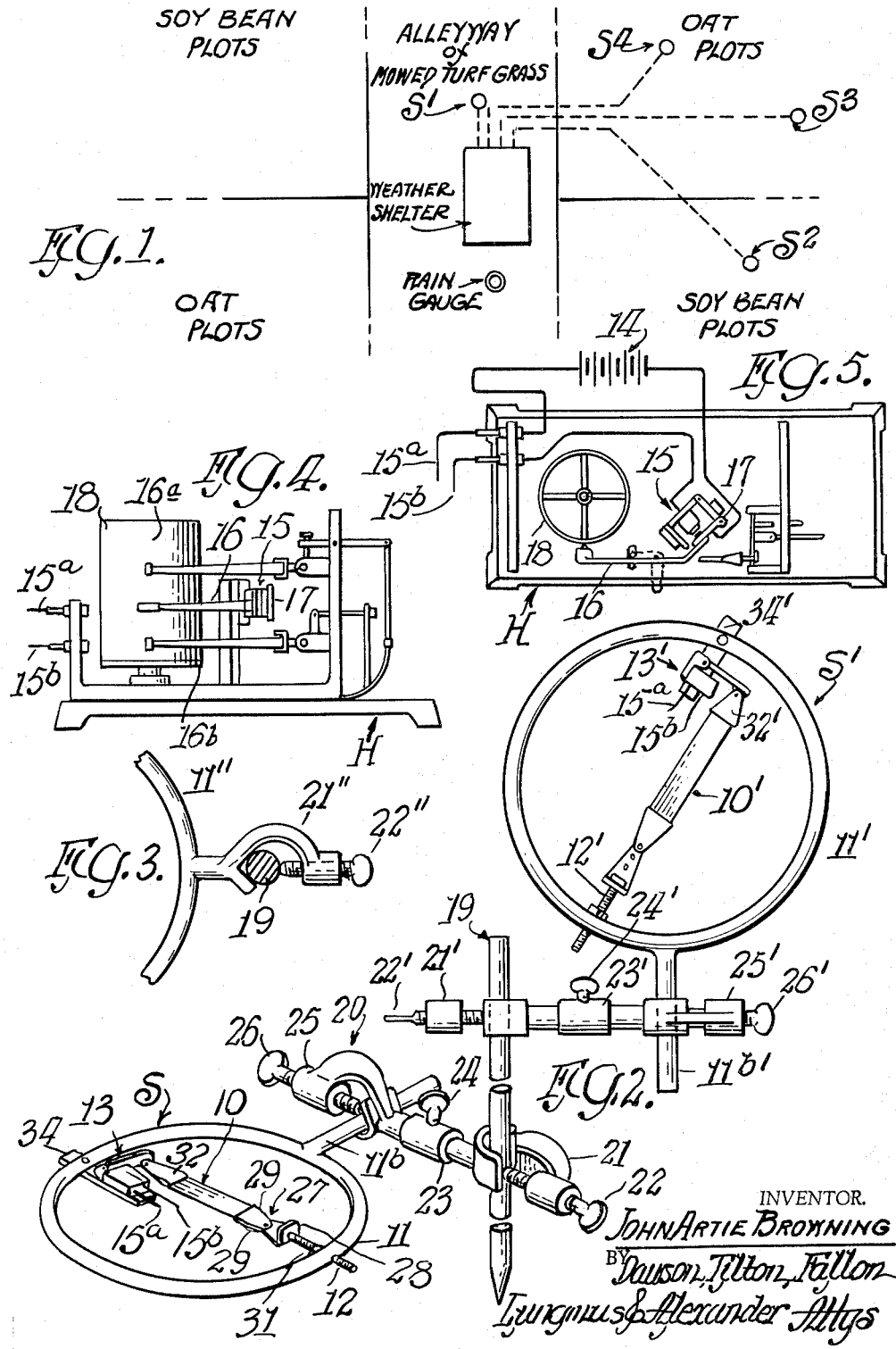

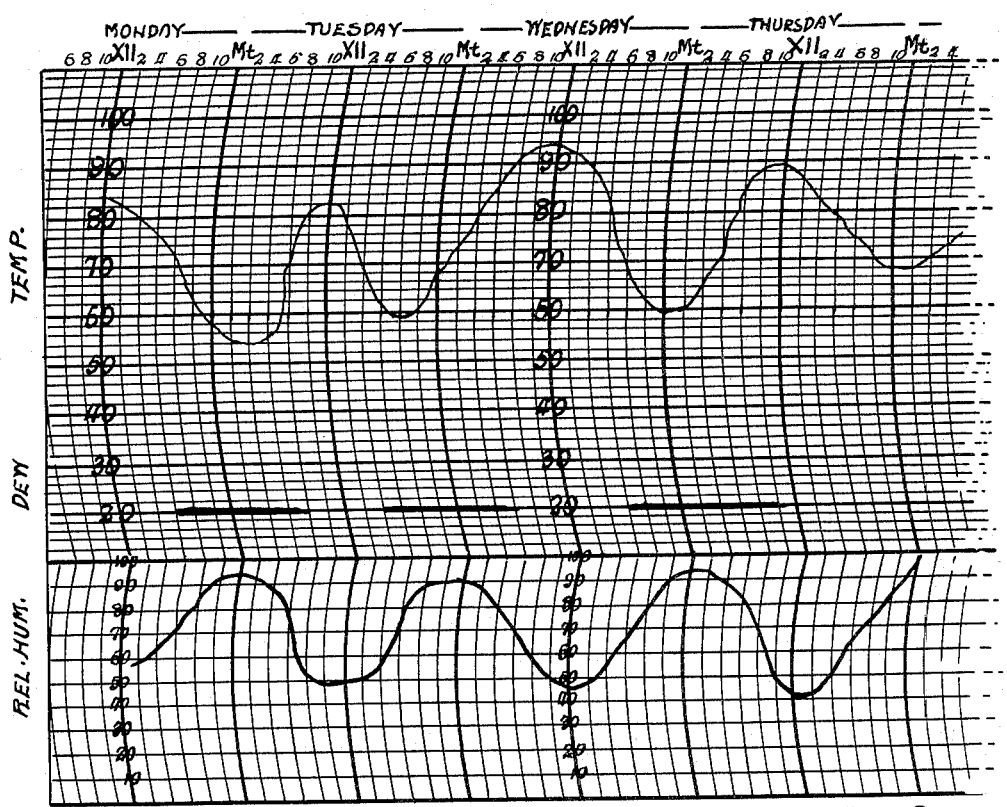
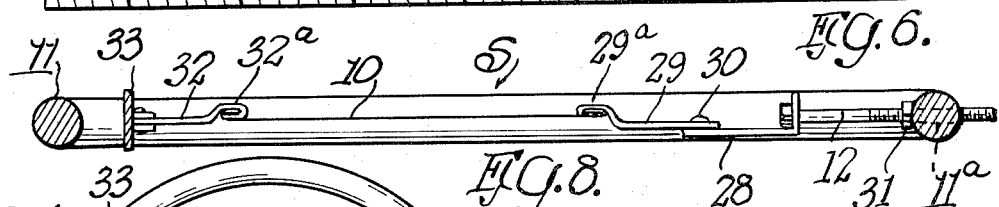
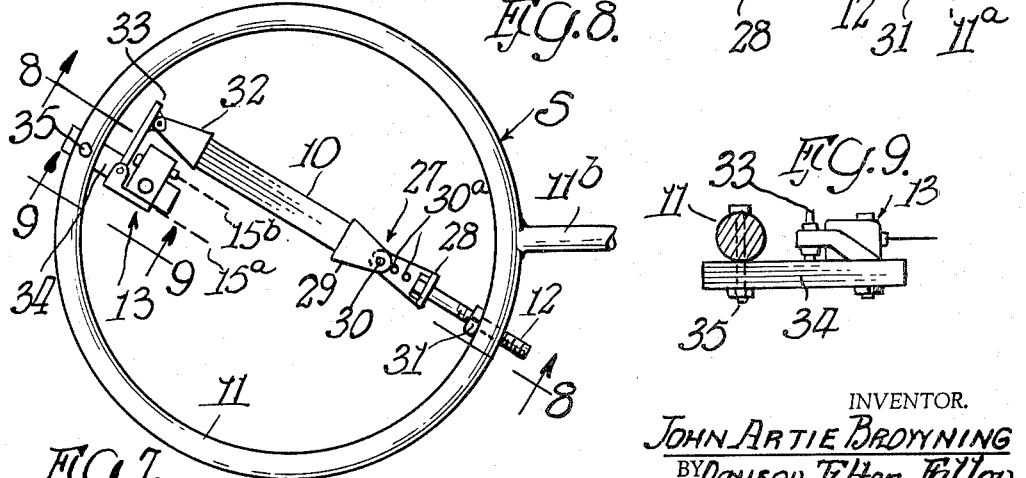

3,217,542
DEW SENSING DEVICE
John Artie Browning, Ames, Iowa, assignor to Iowa State University Research Foundation, Inc., Ames, Iowa, a corporation of Iowa
Filed Apr. 8, 1963, Ser. No. 271,157
2 Claims. (Cl. 73—336)

This invention relates to a dew sensing device and, more particularly, to a device which reports the incidence of dew in the form of a useful, permanent record.

Dew is a very important component of the environment in which plants live, for it provides moisture to sustain the life of the plant, but, simultaneously, moisture to facilitate entry of disease-causing organisms.

Dew is an important source of water for plants in areas having limited rainfall. In such areas, dew may be deposited every clear night in quantities adequate to provide water necessary for survival. One study showed that in a water deficient area of the Pacific Northwest, water deposited as dew could total about 13% of that deposited as rainfall. While the above is not unimportant, it is the relationship between moisture and diseases that necessitates most interest in dew.

Moisture is very important in plant diseases for two reasons: (1) Most plant diseases, caused by microscopic fungi, are initiated by seed-like structures called spores. Spores of some fungi, like the bean anthracnose fungus, are formed and dispersed only in the presence of free moisture. Others, like the late blight fungus, are formed and dispersed in the presence of high relative humidities. Still others, like the cereal rust fungi, are dispersed only during the hot, dry period of the day. (2) The germ tubes from practically all fungus spores, regardless of under what moisture conditions the spores were formed, are very sensitive to desiccation and the presence of free moisture, as light rain or dew, is required for spore germination and subsequent development. A spore may remain quiescent on the leaf for an indefinite period until it becomes sufficiently wet from free moisture. Then, under a microscopic film of water, it springs to life, to produce a germ tube which grows rapidly to a stomate or other point favorable for entering the leaf. Once inside the leaf, the fungus is relatively immune from the fluctuating external environment, except moisture. In nature, heavy dews or gentle rains seem particularly conducive to abundant spore germination and subsequent infection of above-ground plant parts. Yet dew and gentle rain cannot be equated, for a night favorable for heavy dew is likely to be clear and cool, followed by a warm, sunny day. A rainy night, on the other hand, is likely to be warm and cloudy, followed by a cool, cloudy day.

The relation between the speed of spore germination and the length of time plant parts are wet determine whether most pathogens can enter the host. Spores will germinate only in the presence of free moisture, but temperature does determine the rate of germination. Since the time required for spore formation varies with the relative humidity and temperature, and the time required for spore germination and host penetration varies with the duration of dew and temperature, these three components of plant environment: temperature, relative humidity, and dew, become the components of most concern to plant pathologists both in the studying of plant diseases and in the forecasting of possible plant disease outbreaks. The first two components are commonly and easily measured by individuals and by meteorological stations, but few observations are made on dew deposition. Dew may form at different times during the night and may persist for a variable number of hours. Hence, an automatic recorder is indicated, since workers cannot normally make continuous observations. Further, dew may vary at different levels in the plant cover, and on different parts of the plant, depending upon the angle of incidence of the given plant part for radiation to the upper atmosphere. Thus, the leaf of a broad leafed plant such as soybeans, may receive a deposition of dew quite different from that of an oat stem.

Accordingly, a principal objective of the invention is to provide a novel device for sensing dew which makes possible the study and prediction of plant diseases of the character described above.

Another object of the invention is to provide a novel dew sensing device which includes an automatic recording portion so that the dew data is available in useful, permanent form.

Still another object of the invention is to provide a device which simultaneously reports the three major components of environment: temperature, relative humidity, and presence of dew.

Yet another object is to provide a novel dew sensing device wherein the device is arranged to simulate the condition of the leaf under consideration.

The foliage of different species of crop plants may have different radiation characteristics; hence, dew duration may be different for the different crops. For instance, turf grass has a fairly compact radiating surface even though it consists of countless individual leaf blades. Soybeans, also, present an almost solid radiating surface, but for a very different reason: soybeans have broad leaves, with a flat, upper surface facing the zenith. Oats, on the other hand, have a very irregular radiating surface covering a considerable volume. This irregular surface consists entirely of green tissue subject to disease attack. Oat leaves are oriented at all angles, but their leaf sheaths and stems are oriented vertically.

Thus, another object of the invention is to provide a device useful in approximating dew duration on different crops by placing the dew sensing element at the surface of each crop, oriented so as to approximate the radiation angle characteristic of the particular crop.

The recording form of the device used in the practice of the invention is termed a dew-recording hygrothermograph and is an instrument which can facilitate measurement of the three components of the environment of most importance to plant diseases, and including the continuous measurement of dew simultaneously in several locations and at different angles relative to the upper atmosphere. Further, these measurements are recorded on a single chart for convenient study and comparison. The provision, therefore, of a dew-recording hygrothermograph constitutes a further object of the invention.

Other objects and advantages of the invention may be seen in the details of construction and operation set down in this specification.

The invention is described in conjunction with an illustrative embodiment in the accompanying drawing, in which—

FIG. 1 is an aerial schematic view of an agricultural plot showing an installation of the inventive device;

FIG. 2 is a fragmentary perspective view of the inventive sensor;

FIG. 3 is a fragmentary sectional view of a modified form of the sensor mounting;

FIG. 4 is a fragmentary elevational view of the recording portion of the dew-recording hygrothermograph;

FIG. 5 is a top plan view, in fragmentary form and with a portion schematically represented, of the dew-recording hygrothermograph of FIG. 4;

FIG. 6 is a fragmentary elevational view of a chart carrying information derived from measurement of the three variables mentioned above;

FIG. 7 is a fragmentary enlarged top plan view of the sensor seen in FIG. 2;

FIG. 8 is an enlarged fragmentary sectional view, taken along the sight line 8—8 of FIG. 7; and FIG. 9 is an enlarged fragmentary sectional view taken along the sight line 9—9 of FIG. 7.

Before describing the structure involved, a brief description of the use of the invention is believed to be in order. FIG. 1 illustrates an air view of a typical experimental area in which certain important representative crop species, turf grass, soybeans and oats are under study. The experimental area consists of plots of soybeans and oats, with an alleyway of mowed grass separating the plot areas. The weather shelter, normally placed in the alleyway, contains the recorder portion of the dew-recording hygrothermograph generally designated "H" in FIGS. 4 and 5, for continuous recording of temperature, relative humidity, and the onset and duration of dew. A rain gauge is located near the weather shelter, but wind and other recording instruments (not shown) are normally found at a central location on the experimental farm.

Several dew sensing elements "S" located remotely from the dew-recording hygrothermograph are indicated as follows: $S_1$ is at the surface of the mowed turf grass, $S_2$ is in the soybean canopy, and $S_3$ and $S_4$ are in the oat canopy. Dew sensor $S_1$ can easily be moved for mowing the grass, and then replaced at the surface of the mowed grass. The other three are raised as the plants grow to maintain them in the surface layer of the plant canopy. Sensors $S_1$, $S_2$ and $S_3$ would probably be positioned so that the membranes face the zenith, the best position for maximum radiation to the upper atmosphere, and, therefore, for maximum dew deposition. This approximates the radiation and dew deposition on turf grass and on broad-leaved plants such as soybeans. The membrane of sensor $S_4$ is oriented so that the membrane is perpendicular or at an angle to the ground, to approximate the exposure for radiation to the upper atmosphere of the oat stem.

Thus, a dew-sensing element or sensor in the surface of each species enables the dew-recording hygrothermograph H to record the onset and duration of dew at that level in each crop. Further, adjusting the angle of orientation of the membrane 10 (see FIG. 2) in each sensor relative to the zenith gives data which better approximates the actual onset and duration of dew on the leaves and stems of oats, a crop which, like other small grains, has an especially irregular radiating surface.

The membrane 10 may be advantageously constructed of lamb gut and, in the illustration given, is about 10 millimeters by 75 millimeters in radiation area, having a thickness of the order of 20 microns.

The recorder portion of the dew-recording hygrothermograph, designated "H" in FIGS. 4 and 5, may be a modified version, along the lines described below, of a dew-recording hygrothermograph marketed by Belfort Instrument Corporation, of Baltimore, Maryland under Catalog No. 5–594.

In the illustration given, the membrane 10 is clamped in an iron ring 11 (see FIG. 2), which optimally may be 6" in diameter. The membrane 10 is clamped between an adjusting screw 12 and an electrical switch 13. The electrical switch 13 may be a Minneapolis-Honeywell Micro-switch No. JS220 equipped with a No. 1 SM1 actuator. The Micro-switch 13 is wired in circuit with a 6-volt automobile storage battery 14 and a solenoid 15 by means of conduits 15a and 15b (see FIG. 2). The solenoid 15 is so mounted that when activated it pulls a pen 16 (see FIGS. 4 and 5) into position to inscribe an appropriate mark on the chart provided as part of the dew-recording hygrothermograph (see FIG. 6). The other styli, as for temperature and relative humidity, are designated 16a and 16b in FIG. 4.

The working principle of the lamb-gut membrane 10 is that, when wet with free moisture of dew or rain, it relaxes; when void of free moisture, it contracts. In the dew-recording hygrothermograph H, the dry membrane holds the Micro-switch 13 open and a spring 17 (see FIG. 5) prevents the pen 16 from contacting the chart which is mounted on a drum 18 powered by a suitable clock (not shown). When the membrane becomes wet, however, it relaxes, the Micro-switch 13 closes, and the solenoid 15 pulls the pen 16 into position to record on the chart the onset and duration of free moisture on the membrane 10. This is recorded on the lower range of the temperature scale of a standard hygrothermograph chart, an area otherwise unused during the growing season. The result (FIG. 6) is a most convenient record of temperature, dew and relative humidity—those components of the plant climate in which a plant pathologist is most interested—on the same chart. This facilitates study and understanding of the relationships among the three components.

The six-inch ring 11 is attached to the rod 19 of a standard ring stand, the rod 19 being driven into the ground at a desired location in an experimental plot some distance from the dew-recording hygrothermograph, which, as seen in FIG. 1, is positioned in a standard weather shelter nearby. The ring 11 protects the membrane 10 from damage which may be caused by wind-blown foliage, while at the same time leaving it completely open for irradiation. It has been found that for estimating dew duration on a crop surface, the best exposure of the gauge is at the level of the crop surface. The ring-mount of the sensing element S of the dew-recording hydrothemograph facilitates maintenance of the membrane 10 at the changing level of the crop surface. The ring can be elevated, lowered, or moved to a rod in another location to maintain the membrane in the desired location in the growing plant foliage. In certain studies, it may be advantageous to report information from a plurality of sensors S, in which case a plurality of pens 16 are provided in the dew-recording hygrothermograph, each activated by its respective dew sensing membrane mounted remotely at a desired location in the plant foliage.

A suitable form for mounting the membrane is seen in the lower portion of FIG. 2 wherein the clamp generally designated 20 (of the universal type) is employed to couple the post portion 11b of the ring 11 to the vertical standard 19. As seen in the lower portion of FIG. 2, the clamp 20 includes a post clamping portion designated 21 equipped with a setscrew 22. An intermediate sleeve 23 is provided with a setscrew 24 to couple the post clamping portion 21 to the ring clamping portion designated 25. For this purpose, the ring clamping portion is also equipped with a setscrew, this being designated 26. A wide variety of universal clamps may be employed for this purpose, one suitable clamp being a No. 77–16 Universal Clamp Holder marketed by Arthur S. La Pine, of Chicago, Illinois.

It will be appreciated that a given standard 19 may accommodate a plurality of universal clamps 20, and this is illustrated in FIG. 2, where a second installation is seen in the upper portion thereof. The corresponding parts are similarly numbered in the upper clamp and ring except for the addition of a prime ('). In FIG. 2, it will be seen that the lower ring 11 is generally parallel to the ground, while the upper ring 11' is generally vertical relative to the ground. Any intermediate angle can be conveniently obtained merely by loosening the setscrew 24 or 24', as the case may be, and rotating the ring clamping portion 25 or 25' relative to the post clamping portion 21 or 21'.

In the event that it is only necessary to have the membrane 10 face the zenith, the installation of FIG. 3 may be utilized, in which a simple clamp is employed to connect the ring 11" to the standard 19. The post clamping portion 21" is seen to be provided integral with the ring 11" and equipped with the usual setscrew 22".

Now referring to FIGS. 7-9, the details of construction within the sensor S will now be described. The numberal 27 (see especially FIG. 7) designates a swivel bracket for coupling the membrane 10 to the adjusting screw 12. The swivel bracket 27 includes a screw holder portion 28 and a membrane holder portion 29 pivotally connected together by means of a pivot at 30. Tension on the membrane 10 is adjusted by turning the screw 12 which is threadedly mounted within the ring 11 as at 11a (see FIG. 8). Also, the screw 11 is equipped with a securing nut as at 31. The other end of the membrane 10 is secured in a second clamp holder 32 which is pivotally connected to the switch actuator 33. The membrane 10 is releasably held in the holders 29 and 32 by means of wedges 29a and 32a, respectively, designated only in FIG. 8.

Further, the switch 13 is carried by a bracket 34 suitably bolted to the ring 11 as at 35 (see FIG. 9).

In operation, the course adjustment of tensioning the membrane 10 is achieved through relocating the pivot to one of the openings 30a (see FIG. 7). Thereafter, the fine adjustment is achieved by rotating the screw 12.

Actual operation of the device herein described was performed at the Ames, Iowa Experimental Unit No. 28 beginning on Monday, June 25, 1962, as can be seen in the chart of FIG. 6. There is presented the three lines representing, respectively, from top to bottom, temperature, dew and relative humidity.

The instant invention incorporates a remote dew sensor, and this is made possible by the electro-mechanical arrangement including the Micro-switch 13, thus making it possible to maintain the sensor in the foliage plane and in any desired angular orientation, uninfluenced by any housing such as would be the case if the sensor were incorporated as part of the frame of the recorder portion of the dew-recording hygrothermograph. Incorporating the sensors for relative humidity and temperature in the actual frame of the recording instrument is satisfactory, but this leads to unreliable reports insofar as dew onset and duration is concerned. Thus, to the practice of the invention it is necessary to utilize only one expensive unit which requires protection against weather, and further, the invention permits the use of a single chart for a plurality of reports from a variety of differently located and oriented sensors S.

While in the foregoing specification a detailed description of the invention has been set down for the purpose of explanation thereof, many variations in the details herein given may be made by those skilled in the art without departing from the spirit and scope of the invention.

I claim:

1. A dew sensing device, comprising a standard, a ring-like body positionably mounted on said standard and having spaced-apart supporting portions, an elongated animal membrane shaped to expand upon deposition of dew thereon connected at one end to one of said supporting portions, an electrical switch interconnected between the other end of said membrane and the other of said supporting portions, signal means including a source of electricity coupled to said switch to report the condition of said switch and thereby the deposition of dew on said membrane, clamp means interposed between said body and standard for vertically positioning said body, and rotary mounting means interposed between said clamp means and said body for variably fixing the angular disposition of said body relative to the ground.

2. In combination, a plurality of sensors for reporting temperature, relative humidity and dew information, each of said sensors being coupled to a stylus, a clock-actuated chart selectively engageable by the dew information stylus with the relative humidity and temperature styli being continually engageable with said chart, means including a source of electricity interconnecting the dew information sensor with its stylus, the dew information sensor comprising: a generally rigid planar body having an open central portion and spaced-apart connective portions on opposite sides of said open central portion, a generally planar elongated animal membrane extending across said open central portion and connected to said connective portions, an electrical switch interposed between said membrane and one of said connective portions, said source including means coupled to said switch, and a standard supporting at least one of said dew information sensors, said body being equipped with rotary clamp means engaging said standard for vertically positioning said body and for variably fixing the angular disposition of said body relative to the ground.

References Cited by the Examiner

UNITED STATES PATENTS

| | | | |
|---|---|---|---|
| 916,060 | 3/1909 | Thomson | 73—171 |
| 1,098,472 | 6/1914 | Bristol | 73—336 |
| 1,456,149 | 5/1923 | Renshaw | 346—80 X |
| 2,122,000 | 6/1938 | Beasley et al. | 73—337.5 |
| 2,570,710 | 10/1951 | Quinteros | 73—171 |
| 2,598,529 | 5/1952 | Fritz | 248—124 X |
| 2,694,757 | 11/1954 | Nickells | 73—337.5 X |
| 2,780,687 | 2/1957 | Keenan | 73—337.5 |
| 2,808,722 | 10/1957 | Wallin et al. | 73—337 X |
| 2,850,349 | 9/1958 | Mandel | 346—124 |
| 2,919,091 | 12/1959 | Cook | 248—124 |

OTHER REFERENCES

"Bulletin Hygro-Thermo," by Julien P. Friez & Sons, Belfort Observatory, Baltimore, Md. (received in library Feb. 15, 1937).

ISAAC LISANN, *Primary Examiner.*